United States Patent
Brown (10) Patent No.: US 7,391,194 B2
(45) Date of Patent: *Jun. 24, 2008

(54) APPARATUS AND METHOD FOR MINIMIZING POWER LOSS ASSOCIATED WITH DEAD TIME

(75) Inventor: James S Brown, San Pedro, CA (US)

(73) Assignee: International Rectifier Corporation, El Segundo, CA (US)

( * ) Notice: Subject to any disclaimer, the term of this patent is extended or adjusted under 35 U.S.C. 154(b) by 387 days.

This patent is subject to a terminal disclaimer.

(21) Appl. No.: 11/058,969

(22) Filed: Feb. 16, 2005

(65) Prior Publication Data

US 2005/0184716 A1    Aug. 25, 2005

Related U.S. Application Data

(60) Provisional application No. 60/546,374, filed on Feb. 20, 2004.

(51) Int. Cl.
    *G05F 1/40*    (2006.01)
    *H02H 7/125*   (2006.01)

(52) U.S. Cl. .......................... 323/283; 363/53

(58) Field of Classification Search ................. 323/222, 323/282, 283, 271, 351; 327/175; 363/53, 363/89, 127
    See application file for complete search history.

(56) References Cited

U.S. PATENT DOCUMENTS

| | | | |
|---|---|---|---|
| 4,654,769 A | 3/1987 | Middlebrook | ................. 363/16 |
| 5,479,337 A | 12/1995 | Voigt | |
| 5,532,577 A | 7/1996 | Doluca | ........................ 323/266 |
| 5,615,093 A | 3/1997 | Nalbant | |
| 5,627,460 A | 5/1997 | Bazinet et al. | .............. 323/288 |
| 5,773,966 A | 6/1998 | Steigerwald | |
| 5,905,370 A | 5/1999 | Bryson | ........................ 323/283 |
| 5,929,665 A | 7/1999 | Ichikawa et al. | |
| 5,943,227 A | 8/1999 | Bryson et al. | .................. 363/95 |
| 5,966,003 A | 10/1999 | Takimoto et al. | |
| 5,986,895 A | 11/1999 | Stewart et al. | |
| 6,057,607 A | 5/2000 | Rader, III et al. | .............. 307/11 |
| 6,157,182 A | 12/2000 | Tanaka et al. | ................ 323/284 |

(Continued)

OTHER PUBLICATIONS

"High-Efficiency Predictive Synchronous Buck Driver", Texas Instruments, SLUS486B, Aug. 2001.

(Continued)

*Primary Examiner*—Jessica Han
(74) *Attorney, Agent, or Firm*—Ostrolenk, Farber, Gerb & Soffen, LLP (57) ABSTRACT

Apparatus for minimizing power losses associated with dead time between ON times of two series connected switches of a power converter connected across a supply potential, the apparatus comprising a control arrangement for monitoring a selected parameter associated with power loss during the dead time of the converter; the control arrangement changing the dead time from a first dead time to a second dead time and comparing power loss associated with the selected parameter for the first and second dead times and determining which of the power losses associated with the two dead times is smaller; a dead time implementing stage for implementing the two dead times; and the control arrangement selecting the dead time associated with the smaller power loss and providing a signal to the dead time implementing stage to set the selected dead time.

59 Claims, 4 Drawing Sheets

U.S. PATENT DOCUMENTS

| | | | |
|---|---|---|---|
| 6,246,222 | B1 | 6/2001 | Nilles et al. |
| 6,396,250 | B1 | 5/2002 | Bridge .................. 328/283 |
| 6,535,403 | B1 | 3/2003 | Jungreis et al. |
| 6,614,208 | B2 | 9/2003 | Narita |
| 6,630,797 | B2 | 10/2003 | Qian et al. |
| 6,631,082 | B2 | 10/2003 | Birumachi |
| 6,642,630 | B2 | 11/2003 | Watanabe |
| 6,650,552 | B2 | 11/2003 | Takagi et al. |
| 6,771,059 | B1 | 8/2004 | Zwicker |
| 7,057,910 | B2 * | 6/2006 | Takahashi et al. ........... 323/283 |
| 7,098,640 | B2 | 8/2006 | Brown |
| 2004/0070994 | A1 | 4/2004 | Takagi et al. |
| 2004/0130307 | A1 | 7/2004 | Dequina et al. |

OTHER PUBLICATIONS

Yousefzadeh, V. et al., "Sensorless Optimization of Dead Times in DC-DC Converters with Synchronous Rectifiers", Colorado Power Electronics Center, ECE Department, University of Colorado, Boulder, CO, Jan. 2005, pp. 911-917.

U.S. Appl. No. 09/652,456, filed Aug. 2000, Bridge.

Yee, H.P., "Synchronous Rectifier Controller IC Simplifies and Improves Isolated DC-DC Converter Designs", PCIM, Feb. 2000, pp. 44-51.

Abdoulin, Edgar, "Integrated Controller IC Boosts Efficiency of Synchronous Rectifier-Based Converter", PCIM, Mar. 2000, pp. 42-52.

* cited by examiner

APPARATUS AND METHOD FOR MINIMIZING POWER LOSS ASSOCIATED WITH DEAD TIME

CROSS REFERENCE TO RELATED APPLICATIONS

This application claims the benefit and priority of U.S. Provisional patent application Ser. No. 60/546,374 filed Feb. 20, 2004 entitled POWER LOSS MINIMIZING DEAD TIME, the entire disclosure of which is incorporated herein by reference.

BACKGROUND OF THE INVENTION

The present invention relates to power supplies and in particular to voltage converters employing two controlled switches, one of which operates as a synchronous rectifier. The two switches are generally controlled so that both switches are never on at the same time. A "dead time" is provided between the on-times of the two switches to prevent cross conduction across the DC voltage supply between which the two switches are connected in series.

Synchronous rectification has been widely adopted for use in low voltage output converters of various topologies: buck, boost, flyback and forward. By substituting a MOSFET switch for a silicon or Schottky diode, rectification losses can be dramatically reduced. For synchronous converters, it is essential that a non-overlap period (dead time) be maintained in order to prevent cross conduction of the control switch with the synchronous rectifier switch. The power loss penalty for significant overlap is extremely high compared to the additional conduction losses occurring during dead time.

Still, dead time losses are significant, especially as converter operating frequency is increased. Using the example of a synchronous buck converter with the following characteristics:

Operating frequency=1 Mhz
Input voltage=12 volts
Output voltage=1 volt
Output current=40 amperes
Synchronous switch on resistance=3 mΩ
Synchronous switch body diode VF@ 40A=0.8V Instantaneous power loss will be 4.8 watts with the FET on, but 32 watts with only the body diode conducting. With the above conditions, this translates into an additional 27 mW power loss per nanosecond of dead time. Two switching edges per cycle of 20 ns dead time each results in an additional 1.088 watts of loss in the synchronous switch, a 20% increase in losses for that component. Using a Schottky diode in parallel with the MOSFET will reduce that figure by 30% to 40%, but at additional cost and component count.

Additionally, once the body diode of the synchronous switch conducts, it is subject to a reverse recovery period and associated charge which must be swept out of the junction. This amounts to cross conduction and causes additional losses in the control FET.

The present invention seeks to minimize the power losses associated with dead time. This is accomplished by minimizing dead time to reduce body diode conduction losses, and in some cases, by allowing FET switch cross conduction to eliminate body diode conduction altogether, thus eliminating reverse recovery associated losses.

Methods have been employed in the past to attempt to minimize power losses associated with dead time. However, all of these methods have disadvantages. These methods include adjustable dead time, adaptive dead time and predictive dead time.

With the adjustable dead time method, dead time is adjusted at design so that cross conduction will be avoided under all operating conditions and over the full process variation of all components involved in achieving the dead time. Process variation of semiconductors can be significant and circuit operation may be over a wide range of operating conditions. Consequently, when no crossover is achieved with the worst case components at the worst case conditions, dead time with best case components and conditions is excessive. This results in excessive wasted power loss.

Adaptive dead time is an improvement over the above dead time method in that it can adjust on the fly as conditions change, and adapt to component variations. Essentially, it is a logic control whereby the gate of one switch is prevented from turning on, until the gate of the other switch has been detected to turn off. Superficially, this seems to solve the problem, but in practice it does not. Finite time periods are required for logic control, and for charging and discharging gates of the power switches themselves. In actual practice this results in dead times on the order of 10 ns-to-30 ns per switching transition for a total of 20 ns-to-60 ns per cycle.

Predictive dead time is the third prior art approach. Most of the problem with adaptive dead time is the time required to switch the FETs off and on. Predictive dead time solves that deficiency by using a phase locked loop or some other loop to reduce dead time until it is near zero. There appears to provide many of the same benefits as the present invention, but the use of a control loop has attendant disadvantages. Since this methodology relies on a control loop of some sort to set dead time, there is also an associated settling time in that loop. During transient conditions, cross conduction may occur while the loop tries to settle into a new steady state. If fixed dead time is programmed into the loop to avoid cross conduction, then most of the time there will be more than minimum dead time and associated losses. In any case, the loop solution relies on some arbitrary electrical conditions rather than minimizing the losses associated with dead time.

SUMMARY OF THE INVENTION

It is an object of the present invention to provide an improved method and apparatus for minimizing power losses associated with dead time in a power converter circuit. According to the invention, dead time is varied in such a manner so as to minimize overall converter power losses. Several means are available for monitoring power loss, including monitoring combinations of input and output voltage and current. If input and output voltage are fixed, only current monitoring is required. The most cost effective and convenient means, however, is to use control switch duty factor as a relative gauge of power losses.

Assuming a control loop which regulates a fixed power supply output voltage for a given input voltage and output current, control switch duty factor must be increased to compensate for increased converter power losses. Consequently, circuitry and/or a processing algorithm which adjusts dead time in such a way so as to minimize duty factor is de-facto minimizing converter power loss.

Dead time requirements vary depending on input voltage, load current, temperature, and peak switch current. Normally, compromise values of dead time must be chosen which best accommodate the full range of conditions. The present invention dynamically adjusts dead time for the lowest power loss in consideration of all of the above factors.

Other features and advantages of the present invention will become apparent from the following description of the invention which refers to the accompanying drawings.

BRIEF DESCRIPTION OF THE DRAWING(S)

The above and other features and advantages of the invention will become apparent from a review of the following detailed description, in which.

DETAILED DESCRIPTION OF PREFERRED EMBODIMENTS OF THE INVENTION

Figure 1:
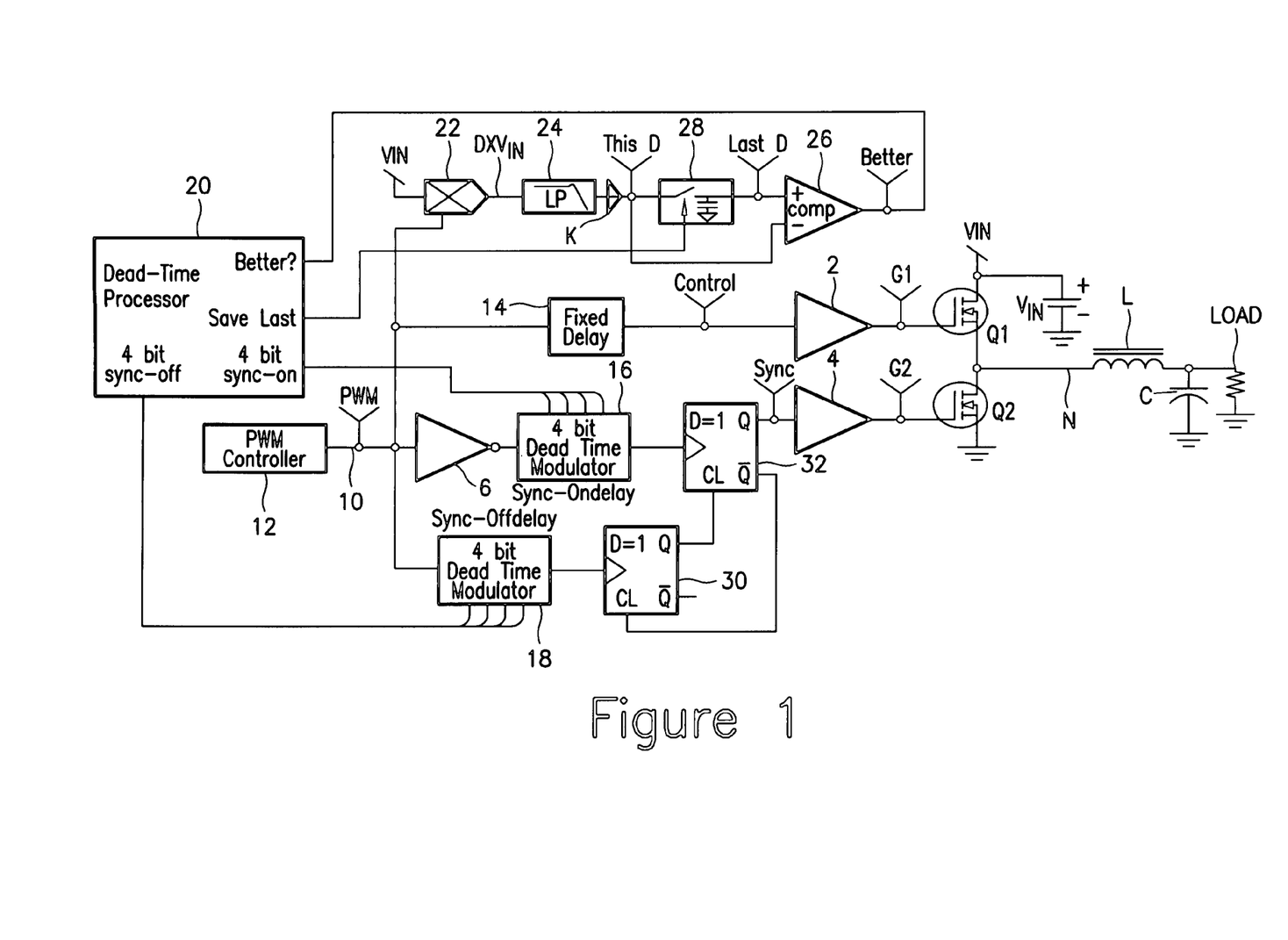
FIG. 1 is a block diagram of one embodiment of a circuit implementation according to the invention.

Turning now to the drawings, FIG. 1 shows one possible implementation of the present invention which combines digital and analog circuitry. Others are possible and most blocks and functions can be implemented with digital circuitry as well as analog.

FIG. 1 shows a DC-DC converter circuit that has been modified to incorporate the technique according to the present invention to minimize power losses during dead time. The converter includes two switches, $Q_1$ and $Q_2$, typically MOSFETs, connected in series between the power supply nodes $V_{IN}$ and ground. The converter shown is a buck converter, but the invention is applicable to any form of switching mode power supply with synchronous rectification.

As well known, the switched node N of a buck converter is coupled to the load through an output inductor L. An output capacitor C is coupled across the load. The gate of each switch $Q_1$ and $Q_2$ is coupled to pulse width modulated (PWM) signals from a PWM controller 12 via gate drive circuitry 2 and 4, shown schematically, and the additional circuitry of the invention now to be described. Since the gate drive signals are complementary, an inverter 6 is shown schematically in one of the gate drive channels. As well known, in a buck converter, switch $Q_1$ functions as the control switch and switch $Q_2$ functions as a synchronous rectifier.

Figure 2:
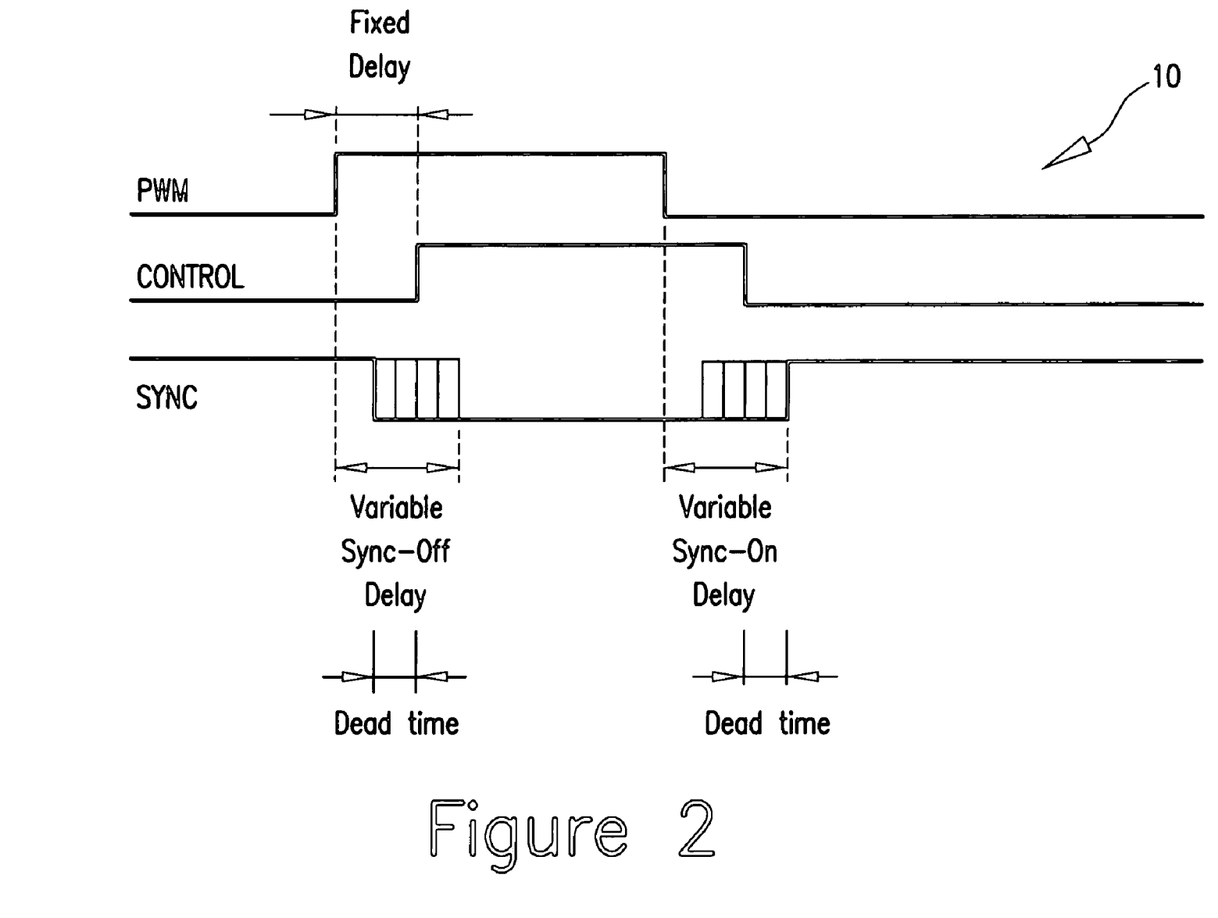
FIG. 2 shows waveforms in the circuit of FIG. 1.

PWM signal 10 is generated in known fashion by PWM controller 12. The PWM signal 10 is delayed by the fixed delay block 14. This allows the programmable dead time range to include both positive to negative values of dead time. The invention allows the off-time and on-time of the synchronous switch $Q_2$ gate signal to be varied, as shown in FIG. 2, thus changing the amount of dead time. The Sync-On delay is implemented, for example, via a 4 bit dead time modulator 16, which may comprise, e.g., a counter, tapped analog or digital delay line, or single shot circuit. Likewise the Sync-Off delay is implemented by a similar modulator 18. They are programmed independently by the dead-time processor 20 and allow independent adjustment of the Sync-On and Sync-Off delay time.

In the depicted implementation, changes in duty factor of the PWM signal 10 are used to estimate power loss changes. A multiplier block 22 is used to modulate $V_{IN}$ (the supply voltage to switches $Q_1$ and $Q_2$) with the PWM signal, producing the signal $D \times V_{IN}$, which is proportional to the duty factor. This signal is passed though a low pass filter 24 creating a slow moving signal which is equal to what the output voltage would be if there were no converter losses. This signal is amplified (now $k \times D \times V_{IN}$) and split into two paths. One path goes directly to the decision comparator 26 and the other path is through, for example, a sample and hold module 28 before being applied to the decision comparator 26. The sample and hold module 28 is used to save the previous "$k \times D \times V_{IN}$" signal so that it can be compared to the one produced after a change in dead time.

A sample and hold module 28 is shown in the depicted embodiment, but the sample and hold function can be implemented in various ways, including, for example, using an "N" bit memory or other equivalent techniques. Similarly, the comparator function can be performed by a logic magnitude comparator, for example, or other equivalent techniques.

The dead time processor 20 (DTP) may be implemented with logic circuitry, a microcontroller, or a microprocessor. The DTP 20 controls the sample and hold circuit 28, sets the dead time via the dead time modulators 16 and 18, and processes the "Better" signal from the output of the decision comparator. If the new signal (This D) is smaller than the previous signal (Last D), then the new dead time is "Better" and the DTP saves this new dead time value. Otherwise the new one is discarded and the old dead time is restored. A delay is required after changing the dead time to allow the power supply feedback circuitry to settle on a new duty factor. Many factors can effect this time, but in practice a time of about 100× the switching period of the power supply seems to work well.

Though not necessary to demonstrate the principle, in practice the DTP 20 preferably averages multiple decisions over a relatively long period of time before reaching a final conclusion about a particular dead time in order to obtain reliability and prevent false dead time setting due to noise or transients. Hundreds of samples or more are desirable. This effectively averages out the effect of rapid load transients on power supply duty factor. The same averaging technique is applicable if some other means besides duty factor is used to determine power loss.

FIG. 2 shows waveforms of the circuitry of FIG. 1. PWM signal 10 is as shown. Signal CONTROL is delayed by the fixed delay of delay module 14. The signal SYNC supplied to the gate of synchronous switch $Q_2$ has a variable sync-off delay and a variable sync-on delay as described above, thus determining the dead time between signals CONTROL and SYNC. The sync-off delay is determined by the DTP 20 and supplied as a 4 bit digital signal to the modulator 18. The output of modulator 18 is provided to D flip-flop 30, which, when it sets, clears D flip-flop 32, turning off the switch $Q_2$ at the variable delay. Similarly, modulator 16 turns on the switch $Q_2$ by setting D flip-flop 32 at the selected variable on delay. When flip-flop 32 output is high, switch $Q_2$ is turned on. When flip-flop 32 output goes low, it clears flip-flop 30 so that flip-flop 30 will be ready to set at the next sync-off delay as determined by modulator 18. The fixed delay 14 in the control channel delays the CONTROL PWM signal a sufficient amount of time so that modulators 16 and 18 can, effectively, implement both positive and negative dead times in the synchronous channel, effectively allowing the synchronous turn-on and turn-off to be either delayed or advanced, as required to achieve the selected dead time.

The invention may be implemented using digital PWM or digital signal processing (DSP) implementations, but the basic algorithm remains substantially the same.

Figures 3, 3A:
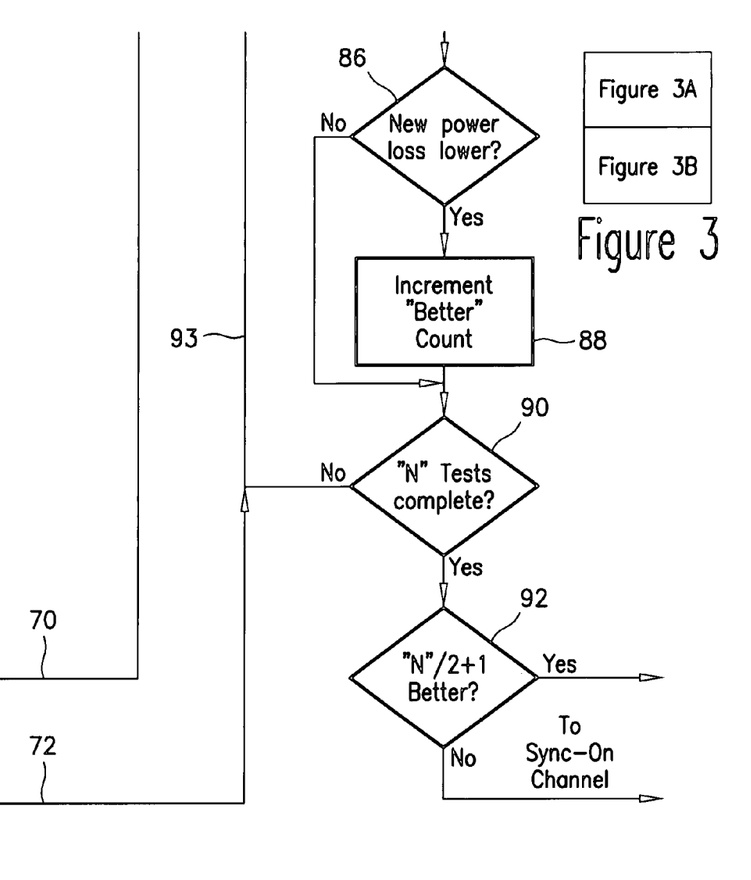
FIG. 3 is a flow chart of an algorithm implemented in a digital implementation of the invention.
Figure 3A:
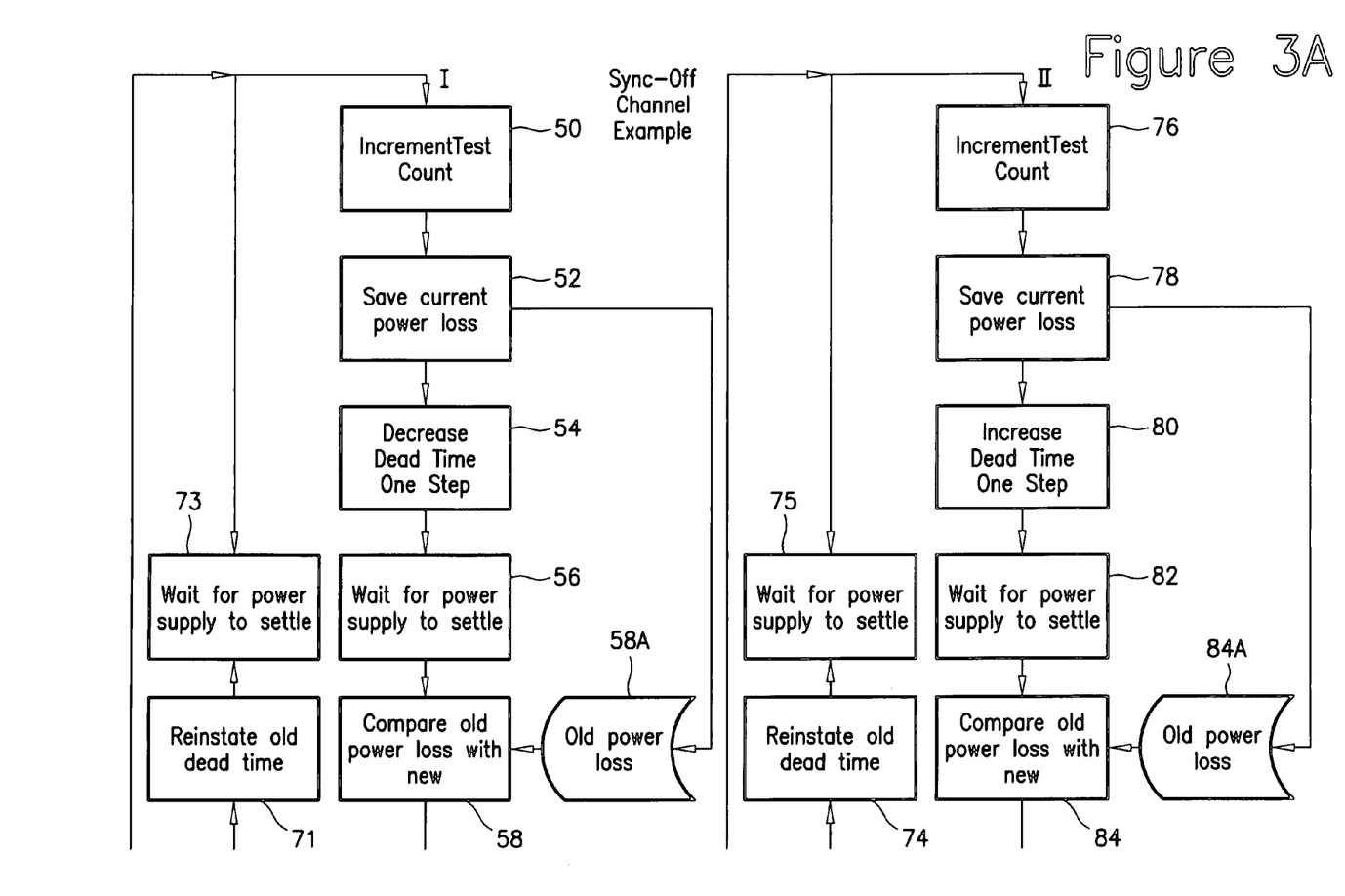
Figure 3B:
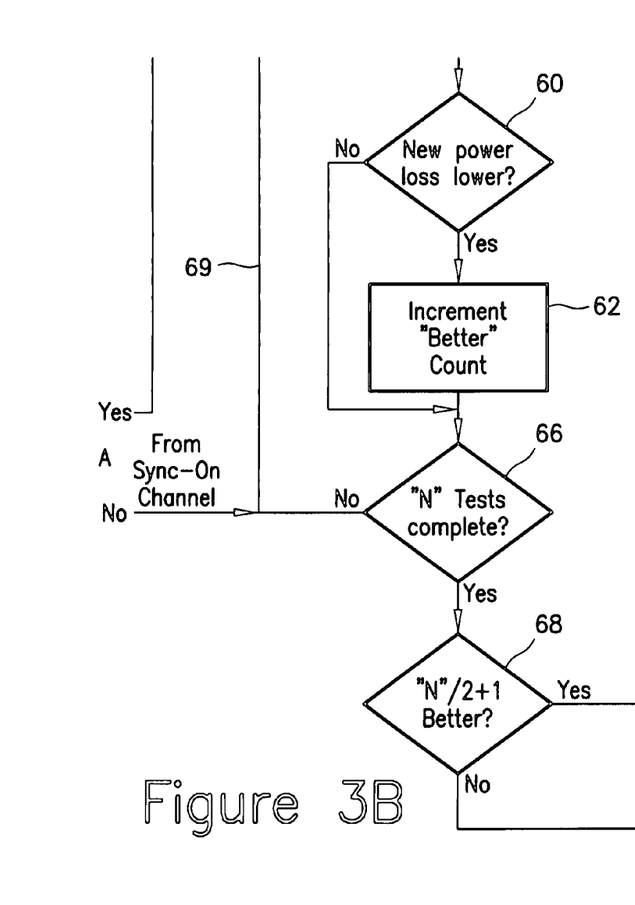

FIG. 3 shows the basic algorithm which may be implemented with a digital signal processor, microprocessor, microcontroller, or logic state machine for implementation of the invention shown in FIG. 1. It also substantially shows an example of the process implemented by the circuitry of FIG. 1.

With reference to FIG. 3, only the flow for the sync-off channel is shown. As described below, the sync-on channel flow is substantially the same. Starting at A, assuming that the sync-off delay has been set and the result of the previous dead time was that the power loss resulting from the last dead time showed that the last sample was better than the previous sample, that is, resulting in a lower duty cycle and thus a lower power loss, entry into the flow is via "yes" at point A. A test counter that counts to "N" is incremented at 50. The current power loss is sampled and saved at 52. The dead time is shortened or decreased by one step as indicated at 54. This means the off delay is increased, since the dead time is decreased. Whether the dead time is decreased or increased initially is arbitrary. However, since the goal is to decrease power losses and this is accomplished by decreasing dead time, dead time is preferably decreased initially. In the second part (II) of the FIG. 3 flow, dead time will be increased, and the dead time that results in the lower power loss will be implemented.

A delay is implemented to allow the power supply voltage to settle as shown at 56. The new power loss (after the dead time has been changed) is now compared with the old power loss at 58. The old power loss has been saved from the previous step 52 as shown at 58A. If the new power loss is lower (for example, as determined by duty cycle), as indicated by decision block 60, flow is to block 62 wherein the "better" counter is incremented. The "better" count keeps track of the number of times the new power loss is better than the old.

If the new power loss was not better than the old power loss at step 60, the counter is not incremented. Flow is then to decision block 66 to determine if N tests are complete. As discussed above, a plurality of tests are preferably made to obtain reliable results. If N tests are not complete, flow is via line 69. At 71, the previous dead time is reinstated and a delay is implemented at 73 to allow the power supply to settle and the test counter is again incremented at 50 and the comparison is again made with the old power loss. Once N tests have been completed, exit is to 68. The dead time will have been last implemented at step 54. N tests are made to ensure that the comparisons are reliable, to account, for example, for noise or load transients which could cause an error if only a single test were made. By making multiple tests, greater accuracy and reliability is obtained.

At step 68, a determination is made if N/2+1 of the tests were better, that is, if the "better" counter shows that more than half the tests made showed a better power loss. If so, then entry is made via flow line 70 to part II of the flow. If N/2+1 tests were not better, then the old dead time is reinstated at 74 and a delay is implemented at 75 before proceeding to step 76.

At step 76, the test counter "N" is again incremented. The current power loss is saved at 78, the dead time is increased by one step at 80, reducing the sync-off delay. At 82, a delay is implemented to allow the power supply to settle. At 84, the old power loss 84A saved at step 78 is compared with the new power loss. The old power loss is shown at 84A. At step 86, a determination is made as to whether the new power loss is lower with the increased dead time. If the new power loss is lower, the "better" counter is incremented at 88. If the new power loss is not lower or after incrementing the better counter at 88, a check is made to determine if N tests have been completed. If not, a return is made via line 93 and the test counter is incremented again at 76 and the comparison at 84 is again made. Once N tests have been completed at step 90, a check is made at 92 to determine that more of the N tests were better. If this is the case, then the flow is to the synchronous on channel flow which is substantially identical to the synchronous off channel example shown in FIG. 3. The synchronous on channel dead time delay will be processed in the same way as the synchronous off channel example shown in FIG. 3. Accordingly, in the synchronous on channel, similar flow will occur in that the old power loss will be compared with the new power loss for both a decrease and an increase in the dead time, and if the power loss is better, the new dead time will be maintained, and if not, the old dead time will be restored, substantially the way as shown in the synchronous off channel example of FIG. 3.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. Apparatus for minimizing power losses associated with dead time between ON times of two series connected switches of a power converter connected across a supply potential, the apparatus comprising:

a control arrangement for monitoring a selected parameter associated with power loss during the dead time of the converter;

the control arrangement changing the dead time from a first dead time to a second dead time and comparing power loss associated with the selected parameter for the first and second dead times and determining which of the power losses associated with the two dead times is smaller;

a dead time implementing stage for implementing the two dead times; and the control arrangement selecting the dead time associated with the smaller power loss and providing a signal to the dead time implementing stage to set the selected dead time.

2. The apparatus of claim 1, wherein the dead time implementing stage implements a variable turn-off of a control signal to one of the switches and a variable turn-on of the control signal to said one of the switches.

3. The apparatus of claim 2, wherein the one of the switches performs a synchronous rectification function and the other switch is a control switch.

4. The apparatus of claim 2, wherein the control arrangement comprises a module sampling the pulse width modulated signal at selected instants in time corresponding to the first and second dead times; and a processor for controlling timing of the sampling.

5. The apparatus of claim 4, wherein the sampling module comprises a sample and hold module.

6. The apparatus of claim 4, wherein the sampling module comprises a digital memory.

7. The apparatus of claim 4, wherein the control arrangement further comprises a comparator having one input coupled to an output of the sample and hold module and a second input coupled to an input to the sample and hold module whereby the comparator compares first and second time delayed samples of said pulse width modulated signal and determines which of the samples is associated with a smaller power loss.

8. The apparatus of claim 7, wherein a reduced duty cycle is associated with a smaller power loss.

9. The apparatus of claim 7, wherein said control arrangement further comprises a modulator stage for modulating the supply potential with said pulse width modulated signal to produce a signal proportional to the duty cycle of the pulse width modulated signal.

10. The apparatus of claim 9, wherein the modulator stage comprises a multiplier.

11. The apparatus of claim 9, wherein said control arrangement further comprises a low pass filter converting said signal proportional to the duty cycle to a filtered signal corresponding to the output voltage of the converter if there were no converter losses.

12. The apparatus of claim 4, wherein the dead time implementing stage comprises first and second variable delay circuits controlled by the processor.

13. The apparatus of claim 12, wherein the first and second variable delay circuits receive digital inputs from the processor selecting the amount of delay time at turn-on and turn-off of said one of said switches.

14. The apparatus of claim 4, wherein the processor comprises any one of a digital signal processor, microprocessor, microcontroller or logic circuit.

15. The apparatus of claim 1, wherein the selected parameter comprises the duty cycle of a pulse width modulated control signal adapted to drive a control terminal of at least one of the switches.

16. The apparatus of claim 1, wherein the control arrangement changes the dead time by changing a variable turn-off delay and monitors the selected parameter after the change to determine if the power loss is smaller, and if it is smaller, implements the turn-off delay, and if the power loss is not smaller, restores the previous turn-off delay.

17. The apparatus of claim 1, wherein the control arrangement changes the dead time by changing a variable turn-on delay and monitors the selected parameter after the change to determine if the power loss is smaller, and if it is smaller, implements the turn-on delay, and if the power loss is not smaller, restores the previous turn-on delay.

18. The apparatus of claim 17, wherein the control arrangement changes the dead time by changing a variable turn-off delay and monitors the selected parameter after the change to determine if the power loss is smaller, and if it is smaller, implements the turn-off delay, and if the power loss is not smaller, restores the previous turn-off delay.

19. The apparatus of claim 18, wherein the control arrangement transmits respective first and second signals to the dead time implementing stage to select a turn-off delay and a turn-on delay of a control signal to one of the switches before the control signal for the control of the other of the switches is turned on and off, respectively.

20. The apparatus of claim 19, further comprising a fixed delay stage for delaying the control signal for the control of the other of the switches.

21. The apparatus of claim 20, wherein the fixed delay stage allows the dead time implementing stage to implement positive and negative amounts of dead time.

22. The apparatus of claim 1, wherein the control arrangement monitors the selected parameter for a plurality of times before setting the change in dead time to improve reliability when the power supply is exposed to fast load transients.

23. The apparatus of claim 1, wherein the control arrangement comprises any one of a digital signal processor, microprocessor, microcontroller or logic circuit.

24. The apparatus of claim 1, wherein the control arrangement comprises a logic magnitude comparator for comparing power loss.

25. The apparatus of claim 1, when the two switches comprise semi-conductor switches.

26. The apparatus of claim 25, where the two switches comprise MOSFETs.

27. A method for minimizing power losses associated with dead time between ON times of two series connected switches of a power converter connected across a supply potential, the method comprising:

monitoring a selected parameter associated with power loss during the dead time of the converter;

comparing power losses associated with the selected parameter for selected instants in time corresponding to a first dead time and a second, changed dead time and determining which of the power losses corresponding to the two dead times is smaller;

selecting the dead time associated with the smaller power loss; and setting the dead time to the selected dead time.

28. The method of claim 27, where the step of setting the dead time comprises implementing a variable turn-off of a control signal to one of the switches and a variable turn-on of the control signal to said one of the switches.

29. The method of claim 28, wherein the steps of implementing a variable turn-off and a variable turn-on comprises using first and second variable delay stages.

30. The method of claim 27, wherein the selected parameter comprises the duty cycle of a pulse width modulated control signal adapted to drive a control terminal of at least one of the switches.

31. The method of claim 30, wherein the step of monitoring comprises sampling the pulse width modulated signal at the selected instants in time corresponding to the first and second dead times.

32. The method of claim 31, wherein the step of comparing comprises comparing first and second time delayed samples of said pulse width modulated signal and determining which of the samples is associated with a smaller power loss.

33. The method of claim 32, wherein a reduced duty cycle is associated with a smaller power loss.

34. The method of claim 32, further comprising modulating the supply potential with said pulse width modulated signal to produce a signal proportional to the duty cycle of the pulse width modulated signal.

35. The method of claim 34, wherein the step of modulating comprises multiplying the supply potential with the pulse width modulated signal.

36. The method of claim 34, further comprising low pass filtering said signal proportional to the duty cycle to a filtered signal corresponding to the output voltage of the converter if there were no converter losses.

37. The method of claim 27, wherein the one of the switches performs a synchronous rectification function and the other switch is a control switch.

38. The method of claim 27, wherein the steps of selecting and setting comprise changing the dead time by changing a variable turn-off delay and monitoring the selected parameter after the change to determine if the power loss is smaller, and if it is smaller, implementing the turn-off delay, and if the power loss is not smaller, restoring the previous turn-off delay.

39. The method of claim 27, wherein the steps of selecting and setting comprise changing the dead time by changing a variable turn-on delay and monitoring the selected parameter after the change to determine if the power loss is smaller, and if it is smaller, implementing the turn-on delay, and if the power loss is not smaller, restoring the previous turn-on delay.

40. The method of claim 39, wherein the steps of selecting and setting comprise changing the dead time by changing a variable turn-off delay and monitoring the selected parameter after the change to determine if the power loss is smaller, and if it is smaller, implementing the turn-off delay, and if the power loss is not smaller, restoring the previous turn-off delay.

41. The method of claim 39, further comprising transmitting respective first and second signals to a variable delay stage to select a turn-off delay and a turn-on delay before the control signal for the control of the other of the switches is turned on and off, respectively.

42. The method of claim 41, further comprising delaying the control signal for the control of the other of the switches.

43. The method of claim 42, further comprising causing the variable delay stage to implement positive and negative amounts of dead time.

44. The method of claim 27, further comprising monitoring the selected parameter for a plurality of times before setting the change in dead time to improve reliability when the power supply is exposed to fast load transients.

45. The method of claim 27, wherein the steps of monitoring, comparing, selecting and setting are performed by any one of a digital signal processor, microprocessor, microcontroller or logic circuit.

46. The method of claim 27, wherein the steps of selecting and setting are performed by any one of a digital signal processor, microprocessor, microcontroller or logic circuit.

47. The method of claim 27, when the two switches comprise
semiconductor switches.

48. The method of claim 47, wherein the semiconductor switches comprise MOSFETs.

49. A method of minimizing power losses associated with the dead time between ON times of two series-connected switches of a power converter connected across a supply potential and having a switched node between the switches, the method comprising:
establishing a first dead time;
monitoring a parameter associated with power loss during the dead time;
determining a measure of power loss associated with the first dead time;
changing the dead time to a second dead time;
determining a measure of power loss associated with the second dead time;
comparing the measures of power loss for the first and second dead times;
determining which measure of power loss is less; and
setting the dead time to the first or second dead time associated with the lower power loss.

50. The method of claim 49, wherein the step of changing the dead time includes both decreasing the dead time and increasing the dead time.

51. The method of claim 49, further comprising performing each of said recited steps a plurality of times and determining if the second dead time results in a lower power loss for a majority of said times, and if so, setting the dead time to the second dead time, and if not, restoring the first dead time.

52. The method of claim 49, wherein the step of changing the dead time comprises changing the turn-off time of a control signal to one of said switches.

53. The method of claim 49, wherein the step of changing the dead time comprises changing the turn-on time of a control signal to one of said switches.

54. The method of claim 49, wherein the step of changing the dead time comprises changing the turn-off time and the turn-on time of a control signal to one of said switches.

55. The method of claim 54 wherein the one of said switches performs synchronous rectification.

56. The method of claim 55, further comprising delaying a second control signal to a second of said switches acting as a control switch.

57. The method of claim 49, wherein said switches each comprises a MOSFET.

58. The method of claim 49, wherein the step of monitoring a parameter comprises monitoring the duty cycle of a pulse width modulated control signal supplied to at least one of said switches.

59. The method of claim 58, wherein when a dead time is set that results in a lower power loss, the duty cycle is decreased.

* * * * *